(12) United States Patent
Hall

(10) Patent No.: US 6,729,766 B2
(45) Date of Patent: May 4, 2004

(54) RETENTION OF CERAMIC BEARINGS

(75) Inventor: Mark Stock Hall, Lawrence County, PA (US)

(73) Assignee: Vesuvius Crucible Company, Wilmington, DE (US)

( * ) Notice: Subject to any disclaimer, the term of this patent is extended or adjusted under 35 U.S.C. 154(b) by 35 days.

(21) Appl. No.: 10/052,140

(22) Filed: Jan. 17, 2002

(65) Prior Publication Data

US 2003/0133632 A1 Jul. 17, 2003

(51) Int. Cl.[7] ............................................... F16C 33/22
(52) U.S. Cl. ...................... 384/297; 384/282; 384/284; 118/33; 264/259
(58) Field of Search ................. 384/297, 276, 384/277, 278, 282, 283, 284, 295, 416, 418, 419, 100, 137; 118/33, 423; 264/259

(56) References Cited

U.S. PATENT DOCUMENTS

| 174,331 | A | * | 2/1876 | White ......................... 384/297 |
| 2,276,143 | A | * | 3/1942 | Bell ............................ 264/259 |
| 5,017,022 | A | * | 5/1991 | Ruggles et al. ............. 384/100 |
| 5,072,689 | A | * | 12/1991 | Nakagawa et al. ..... 384/283 X |
| 5,099,780 | A | * | 3/1992 | Nappier et al. ................ 118/33 |
| 5,538,558 | A | * | 7/1996 | Ookouchi et al. ........... 118/423 |
| 5,549,394 | A | * | 8/1996 | Nowak et al. ............... 384/282 |
| 5,571,327 | A | * | 11/1996 | Ookouchi et al. ........... 118/423 |
| 5,628,569 | A | * | 5/1997 | Hayakawa et al. ......... 384/278 |
| 5,667,310 | A | * | 9/1997 | Oyagi et al. ................. 384/137 |
| 5,711,613 | A | * | 1/1998 | Ookouchi et al. ........... 384/283 |
| 2002/0181812 | A1 | | 12/2002 | Nishizaka et al. |

FOREIGN PATENT DOCUMENTS

JP          5-126138      *   5/1993

* cited by examiner

Primary Examiner—David A. Bucci
Assistant Examiner—Colby Hansen
(74) Attorney, Agent, or Firm—James R. Williams; Robert Klemz

(57) ABSTRACT

The invention relates to a refractory bearing and in particular to a bearing for use in contact with molten metal, such as zinc and aluminum. The bearing includes a housing with a working surface and at least one wear-resistant insert secured to the working surface. The insert is secured to the housing by mechanically interlocking with a retainer assemblage. In one embodiment, the retainer assemblage engages a relief in the insert to secure the insert to the housing despite dimensional changes caused by thermal expansion. The insert preferably comprises sialon.

11 Claims, 4 Drawing Sheets

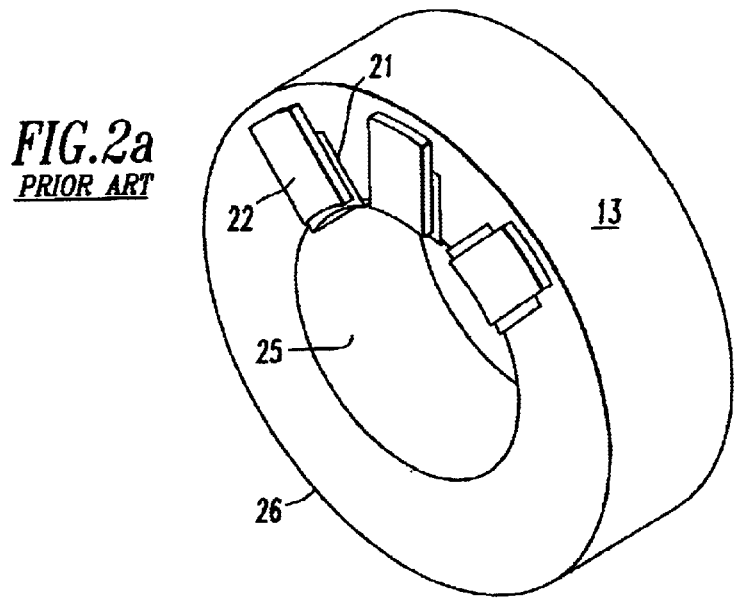
FIG.2a
*PRIOR ART*
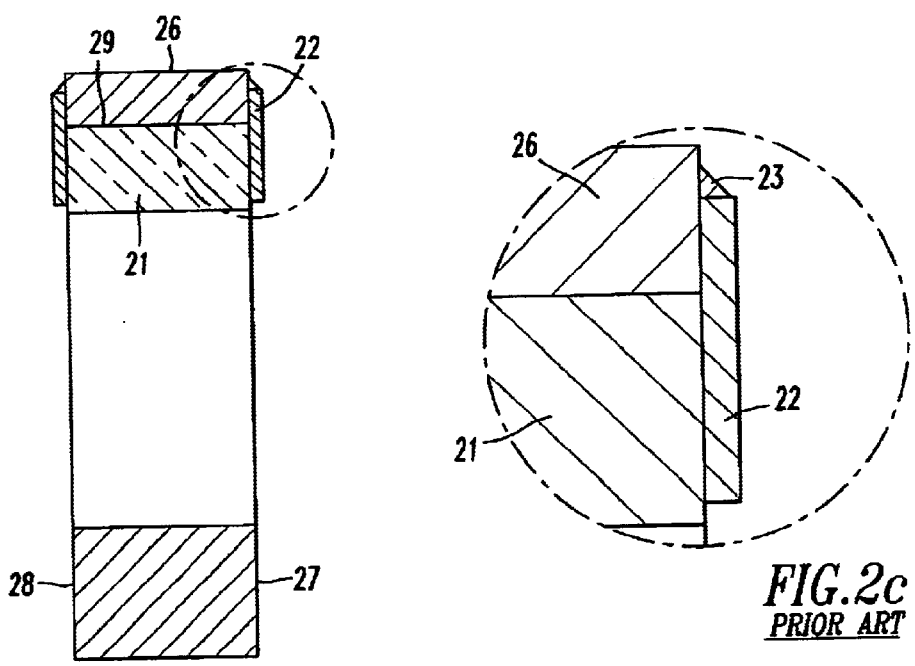
FIG.2b
*PRIOR ART*
FIG.2c
*PRIOR ART*

RETENTION OF CERAMIC BEARINGS

FIELD OF THE INVENTION

The present invention relates to refractory bearings and is particularly concerned with refractory bearings for use in contact with molten metal.

DESCRIPTION OF THE RELATED ART

Bearings typically support a rotating or otherwise moving article. In high temperature applications, bearings often comprise a refractory metal, ceramic or composite. In such applications, bearings may even be in direct contact with molten metals, such as molten zinc or aluminum.

For example, galvanization is the process of forming a protective, anti-oxidant zinc layer on a base metal. A continuous galvanizing apparatus comprises a bath of molten zinc, a sink roll at least partially immersed in the bath, a journal disposed along the longitudinal axis at each end of the sink roll around which the sink roll may rotate, and a set of roll arms with replaceable bearings for supporting the journals. The bath is maintained at a temperature sufficient to keep the zinc molten.

The sink roll forces the base metal, which is often in the form of a sheet or wire, into the molten zinc. The roll rotates as the base metal passes into the molten zinc, under the sink roll, and finally out of the molten zinc. The journals cooperate and rotate with the sink roll. The roll arms support the journals, and the journals are often covered with a hard material, such as tungsten carbide, to resist wear from the bearing. The roll arm can be moved to adjust the depth of the sink roll within the bath.

The requirements for bearings under these conditions are severe. Molten zinc is at least 420° C., typically around 460° C., and corrodes many common bearing materials. Mechanical abrasion is a ubiquitous complication. The bearings wear quickly and must be replaced frequently. Replacement requires the shutdown of the galvanizing operation while new bearings are inserted. Disruption of a continuous galvanizing operation results in significant operator costs and lost production.

Prior art bearings include metal housings, often in the shape of a ring, that are fitted to the roll arm and cooperate with the journals. During operation of a galvanizing bath, the journals contact a working face of the bearing. The high temperature and corrosive environment destroy metal bearings relatively quickly and cause the sink roll to rotate eccentrically, thereby reducing galvanizing efficiency. Worn bearings must be replaced, often at great cost. Prior art also includes metal housings having inserts comprising a refractory material selected for its erosion and corrosion resistance. The journals contact the inserts instead of the metal housing. The inserts are substantially more resistant to wear and corrosion than the metal housing alone and can extend the life of bearings many times.

Sialon is particularly useful in this capacity and consists of a solid solution and/or dispersion of aluminum oxide and aluminum nitride in a silicon nitride matrix. One or more sialon inserts are embedded into the working face of the metal housing. Typically, the inserts are polygonal shapes and are embedded in a plurality of cavities along the working face of the metal housing.

At room temperature, the inserts are secured tightly into the cavities. This may be accomplished using a retaining plate and one or more wedges to improve the tightness of fit. The retaining plate can be welded to the housing and may extend at least partially over the insert in the cavity. Still, inserts have a tendency to fall out at operating temperatures because the thermal expansion of the metal housing is greater than the ceramic inserts. Loss of an insert causes the journal to wobble or otherwise rotate eccentrically. Fortunately, the journals pressing against the inserts can hold the inserts in the cavities despite thermal expansion; however, pressure can be lost when the galvanizing operation is stopped or slowed. In such situations, the journal may separate from the insert by one-quarter inch or more. An insert can then slip from its cavity. The tendency of a ceramic insert to loosen and fall from a metal cavity increases with temperature and would be even more likely at higher temperatures, such as with molten aluminum baths which are typically at least around 700° C. and more commonly around 715° C.

A need persists for a refractory bearing comprising a housing and a wear-resistant insert where the insert is more fixedly secured to the housing and does not depend on the journals to hold it in place. Advantageously, the bearing would be easily manufactured of substantially inexpensive materials and would be suitable for use with molten zinc and aluminum.

SUMMARY OF THE INVENTION

The objective of the present invention is to provide a bearing for high temperature applications, particularly for contact with molten metals. The invention secures a wear-resistant insert to the working surface of the bearing despite disparate dimensional changes caused by thermal expansion.

One aspect of the invention describes the bearing as comprising a housing having a wear-resistant insert at least partially embedded in a cavity of a working surface of the housing. A retainer is secured to the housing and simultaneously engages a relief in the insert, thereby locking the insert into the cavity.

A further aspect of the invention describes the housing as a metal ring adapted to receive a journal. The inner surface of the ring comprises the working surface, which includes a plurality of inserts axially arranged along the working surface. One embodiment of the invention includes a metal ring having three inserts along the working surface.

Another aspect of the invention teaches inserts comprising sialon. In a further aspect of the invention, the retainer may comprise one or more metal pieces and is conveniently welded to a metal housing.

BRIEF DESCRIPTION OF THE DRAWINGS

FIG. 2*a* shows a metal ring bearing of the prior art.

FIG. 2*b* is a cross-section of a prior art bearing.

FIG. 2*c* is a cross-section detail of a prior art bearing.

DETAILED DESCRIPTION OF THE PREFERRED EMBODIMENTS

Figure 1:
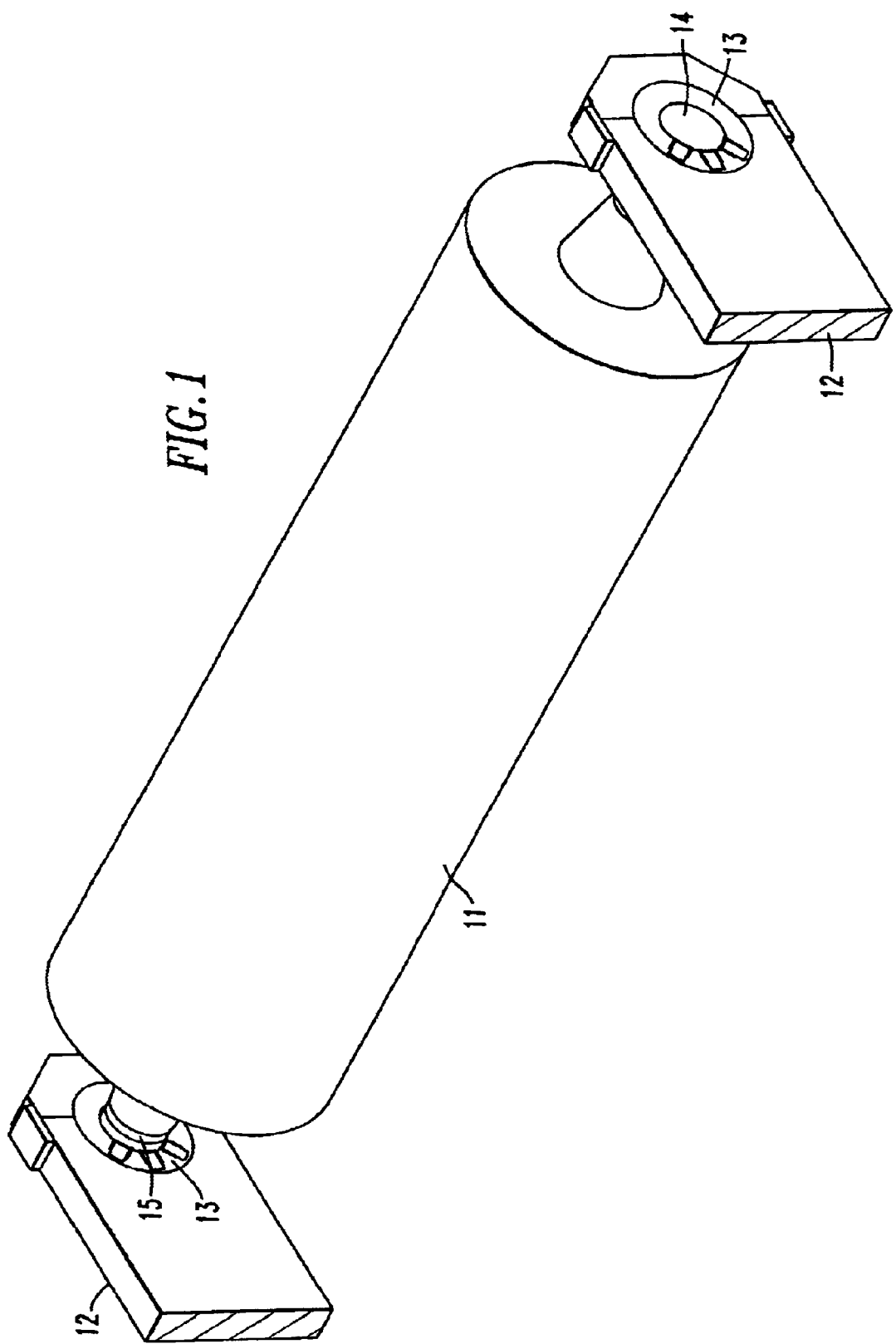
FIG. 1 shows a portion of a galvanizing apparatus, including sink roll and roll arms with bearings.

Refractory bearings of the present invention can be used in many high-temperature applications, including continuous galvanizing operations in which a sheet or wire of a base metal is drawn through a bath of molten zinc to effect a zinc coating on the surface of the base metal. FIG. 1 shows a portion of a continuous galvanizing unit that uses refractory bearings.

A sink roll 11 forces the base metal into the bath of molten zinc (not shown). The sink roll 11 is at least partially immersed in the molten zinc and is supported by journals 14 extending along the rolling axis of the sink roll 11. Roll arms 12 engage the journals 14. Manipulation of the roll arms 12 permits the sink roll 11 to be raised or lowered within the bath. Bearings 13 facilitate rotation of the journals 14 and the sink roll 11. The journals 14 often has a sleeve 15 to reduce wear of the journal 14 by the bearings 13. The sleeve 15 can be any wear-resistant, refractory material, and is often a tungsten carbide cermet overlaid on a stainless steel substrate.

A refractory bearing often comprises a housing having a working surface with at least one cavity containing a wear-resistant insert. Depending on its intended use, a housing can be formed from a variety of refractory materials, including metal, ceramic and composites. Galvanizing bearings typically comprise metal housings. FIG. 2a shows a prior art bearing for a continuous galvanizing unit. The bearing 13 comprises an annular housing 26 adapted to cooperate with a journal along the bearing's inner surface 25. A plurality of wear-resistant inserts 21 are secured within cavities along the inner surface 25. The inserts 21 extend beyond the inner surface 25. Inserts 21 are wear-resistant, refractory materials such as, for example, alumina, silica, magnesia, zirconia and combinations thereof. Sialon is particularly useful because of its resistance to corrosion, mechanical wear and thermal shock.

FIG. 2b shows a cross-section of the bearing. The insert 21 sits in a cavity of the housing 26. In this embodiment, the insert extends from a first annular surface 27 to a second annular surface 28. The retainer assemblages 22 are fixedly secured to the housing 26 and prevent the insert 21 from leaving the cavity along a path perpendicular to the annular surfaces. FIG. 2c details one method of securing the retainer assemblage 22 to the housing 26 with a weld 23. Other mechanical fasteners, such as bolts, rivets, screws, etc., or adhesive fasteners, such as a high temperature phenolic, could alternatively be used to secure the retainer to the housing. Obviously, the retainer assemblage could also be secured to the housing indirectly.

Wedges (not shown) may be used to improve the tightness of fit between the cavity, insert and retainer assemblage. Improved tightness can reduce the tendency of inserts to fall out of the cavity. Wedges include any article that may be used to improve the tightness of fit and comprise, for example, wedges, shims, and the like.

Figure 3A:
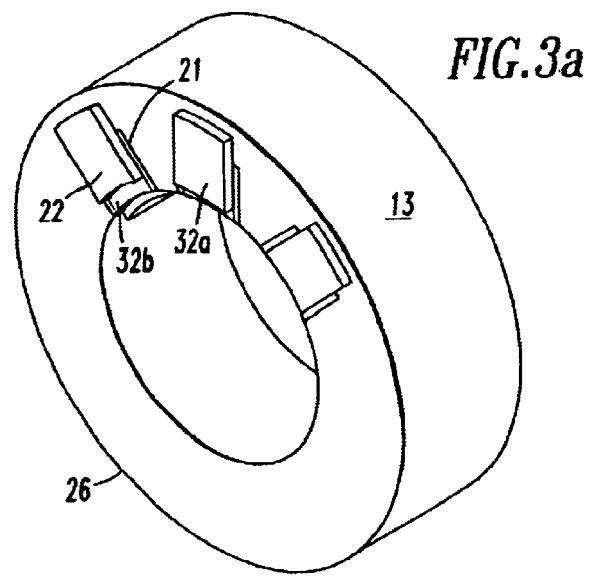
FIG. 3*a* shows a metal ring bearing of the present invention.
Figure 3B:
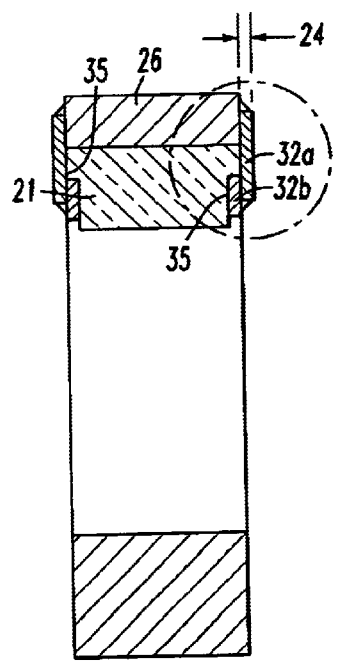
FIG. 3*b* is a cross-section of the present invention.

The present invention improves on the retention of the insert within the cavity. FIG. 3a shows a bearing 13 with a housing 26. A cross-section of the bearing 13, as seen in FIG. 3b, shows an insert 21 having a relief 35. The insert 21 will commonly include more than one relief 35 depending on factors such as geometry, operating temperature and the particular materials in the bearing. FIG. 3b shows two reliefs 35, one on each end of the insert 21.

The retainer assemblage 22 comprises two non-planar portions. An end plate 32a is fixedly secured to the housing 26. A retainer 32b fits in a mating relationship with the relief 35 of the insert 21, thereby locking the insert 21 in the cavity and reducing the likelihood that the insert 21 will fall out. Conveniently, for ease of manufacture, the relief 35 and the retainer 32b are mirror images.

Figure 3C:
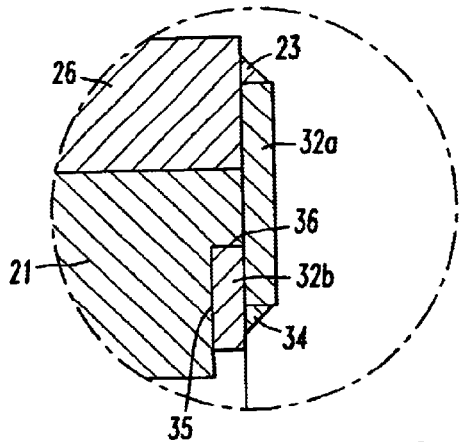
FIG. 3*c* is a cross-section detail of the present invention.

FIG. 3c shows detail of the retainer assemblage 22, insert 21 and housing 26. The retainer 32b mates with the relief 35 of the insert. The retainer 32b is attached to the end plate 32a, for example, with a weld 34. The end plate 32a is fixedly secured to the housing 26, such as with a weld 23. End plates and retainers are preferably comprised of steel and are typically about one to two inches wide. The retainer should be at least about 0.12 inch thick in order to provide a sufficient relief that would secure the insert in the cavity. The required thickness will vary depending on the material used to make the retainer, the operating temperature, the size of the retainer, operating stresses, etc. Preferably, a gap will exist between the relief and retainer. The gap allows for manufacturing variations and thermal expansion. For example, when the retainer is steel, the insert is sialon, and the application is galvanization, a gap of 0.005 inch is normally sufficient.

The relief on the insert is conveniently a rabbet to simplify manufacture. A matching rabbet on the retainer completes the joint. Alternatively, other joint constructions could be used including slanted or dovetail designs. Such joints are known to one skilled in the art. For example, the cavity could have inwardly sloping sides forming a dovetail groove. Such sides would comprise the retainer. The retainer may be an integral part of the housing, as in the dovetail design, or it may be separate, as is shown in the figures. The insert would have a relief comprising sloped sides that cooperate with the dovetail groove. The insert would be placed into the groove and an end plate would close the cavity opening, thereby preventing the insert from escaping. Importantly, the cavity and the retainer cooperate to product a mechanical interlock that cooperates with the relief of the insert to secure the insert in the cavity.

Although the retainer assemblage should be a rigid unit, it may comprise one or more pieces. The retainer assemblage may be machined from a single piece of refractory material or comprise a plurality of pieces. FIG. 3c shows a retainer assemblage consisting of two pieces, an end plate 32a comprising a plate and a retainer 32b also comprising a plate. The two portions are secured together with a joining weld 34.

Figure 4:
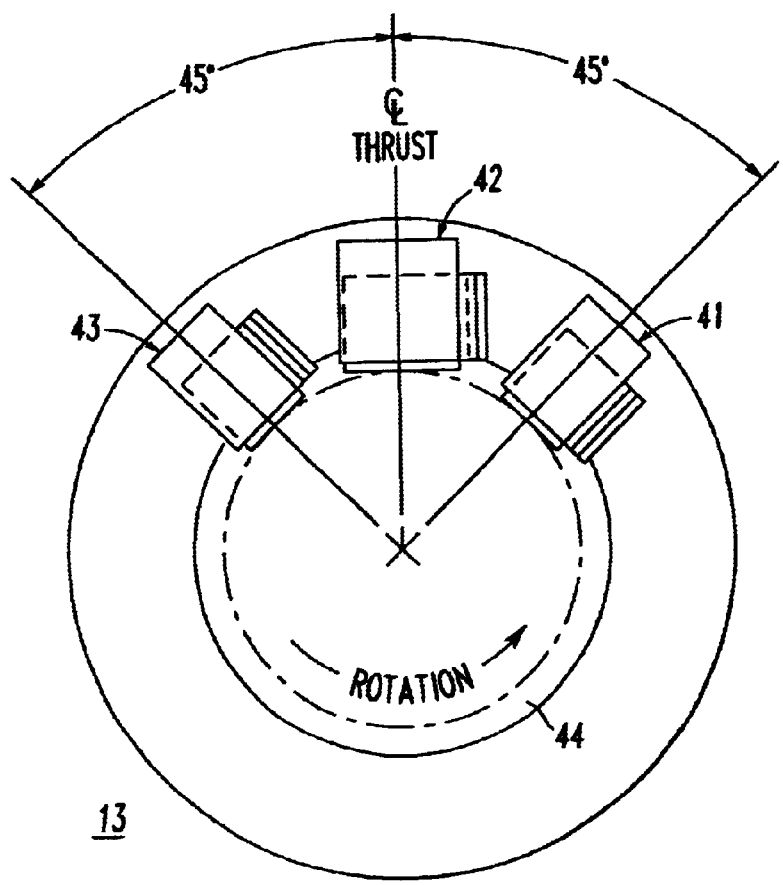
FIG. 4 is a side view of a metal ring bearing.

The bearing may comprise one or more wear-resistant inserts. Ring-shaped bearings for use with a journal will often have three bearings. FIG. 4 shows a ring-shaped bearing 13 adapted for use with a journal and an arrow 44 representing the direction of rotation of the journal. In such a configuration, a load insert 42 supports the force exerted by the journal on the bearing 13. A lead insert 41 wipes dross from the journal so wear of the load insert 42 is reduced. Dross includes solidified metal, slag, dirt and other impurities found in the molten metal. A trailing insert 43 stabilizes the journal in the bearing 13. Point loading on a single insert and a three-insert arrangement typically perform better than a single insert in the shape of an arc. The three inserts are frequently arranged in an arc of less than 180°, and preferably around 90°.

Obviously, numerous modifications and variations of the present invention are possible. It is, therefore, to be understood that within the scope of the following claims, the invention may be practiced otherwise than as specifically described.

What is claimed is:

1. A refractory bearing for molten metal applications above about 400° C. comprising:

a) a housing having an inner surface comprising a working surface, a plurality of retainers and an end plate, the working surface and the retainers defining a plurality of cavities, each cavity having a mechanical interlock; and b) an insert at least partially within each cavity, the insert having a relief and comprising a wear-resistant, refractory material, the relief fixedly secured in the cavity by the mechanical interlock and the end plate.

2. The refractory bearing of claim 1, wherein the wear-resistant refractory material comprises sialon.

3. The refractory bearing of claim 1, wherein the end plate comprises a first plate fixedly secured to the housing, and the retainer comprises a second plate that is fixedly secured to the end plate and engages the relief of the insert.

4. The refractory bearing of claim 3, wherein the retainer and the end plate are formed from a single piece.

5. The refractory bearing of claim 3, wherein the insert presents a surface face to the retainer, and the surface face comprises the relief and, and the relief is at least about 0.12 inch deep.

6. The refractory bearing of claim 1, wherein the end plate is welded to the housing.

7. A refractory bearing for supporting a rotating journal at temperatures above about 400° C. comprising:

a) a metal ring having an inner surface, the inner surface comprising a working surface defining a plurality of cavities;

b) an insert at least partially within each cavity, the insert having a relief and comprising a wear-resistant, refractory material; and c) a retainer assemblage engaging the relief and fixedly secured to the housing, thereby retaining the insert within the cavity.

8. The refractory bearing of claim 7, wherein the bearing includes a lead insert, a load insert and a trailing insert.

9. A refractory bearing for supporting a rotating journal in a molten metal bath above about 400° C. comprising:

a) a metal ring comprising a first annular surface, a second annular surface and an inner surface, the inner surface comprising a working surface defining a plurality of cavities extending from the first annular surface;

b) an insert at least partially within each cavity, the insert comprising a wear-resistant, refractory material and having a relief, an end, and a side; and c) a retainer assemblage fixedly secured to the first annular surface, the cavity and the retainer assemblage cooperating to engage the relief, thereby retaining the insert within the cavities.

10. The refractory bearing of claim 9, wherein the relief is selected from joints consisting of a rabbet and a dovetail.

11. The refractory bearing of claim 9, wherein the metal ring has a rotational axis, and the inner surface defines a plurality of cavities arranged in an arc of less than 180° around the axis.

* * * * *